United States Patent [19]

Lotspeich et al.

[11] 3,994,566
[45] Nov. 30, 1976

[54] SYNCHRONOUS TRAVELING WAVE ELECTRO-OPTIC LIGHT PIPE MODULATOR

[75] Inventors: James F. Lotspeich, Malibu; Richard L. Abrams, Pacific Palisades, both of Calif.

[73] Assignee: Hughes Aircraft Company, Culver City, Calif.

[22] Filed: June 23, 1975

[21] Appl. No.: 589,285

[52] U.S. Cl. ................... 350/160 R; 350/96 WG
[51] Int. Cl.² ........................................ G02B 5/23
[58] Field of Search ............... 350/160, 161, 96 WG

[56] References Cited
UNITED STATES PATENTS

| | | |
|---|---|---|
| 3,551,679 | 12/1970 | Peters et al. .................... 350/160 |
| 3,614,451 | 10/1971 | Gunn ............................... 350/160 |
| 3,772,528 | 11/1973 | Anderson ..................... 350/96 WG |
| 3,874,782 | 4/1974 | Schmidt ........................... 350/160 |
| 3,923,376 | 12/1975 | Martin ......................... 350/96 WG |

*Primary Examiner*—David C. Nelms
*Attorney, Agent, or Firm*—Donald C. Keaveney; Gregory B. Wood; William H. MacAllister

[57] ABSTRACT

There is disclosed a synchronous traveling wave electro-optic modulator for ultra-wideband infrared laser communications systems which provides optical waveguiding of the laser beam through an interaction distance which is large relative to the diffraction limit of the laser beam and which affords essentially perfect radio frequency and optical velocity synchronism at a relatively high electrical impedance level by appropriate choice of the design parameters of the device. The device comprises an array of very slender rectangular rods of electro-optic material such as cadmium telluride laid end to end in juxtaposition to form a light pipe for an infrared laser beam. The length to cross-section ratio of the light pipe is many times greater than that which is determined by the diffraction limit and consequently the voltage and power required to achieve a given depth of modulation is substantially reduced. The modulating signal is applied as a synchronous or nearly synchronous traveling wave across two parallel strip electrodes which form a TEM transmission line exhibiting a purely resistive impedance, with matched termination, and a theoretically infinite base bandwith. An appropriate dielectric environment is provided by surrounding members enclosed in electrical shielding. A structural variable or parameter which can be adjusted to achieve a desired signal velocity for a given dielectric environment is $w/d$, the width of the strip electrodes relative to their separation by the thickness of the electro-optic material.

9 Claims, 5 Drawing Figures

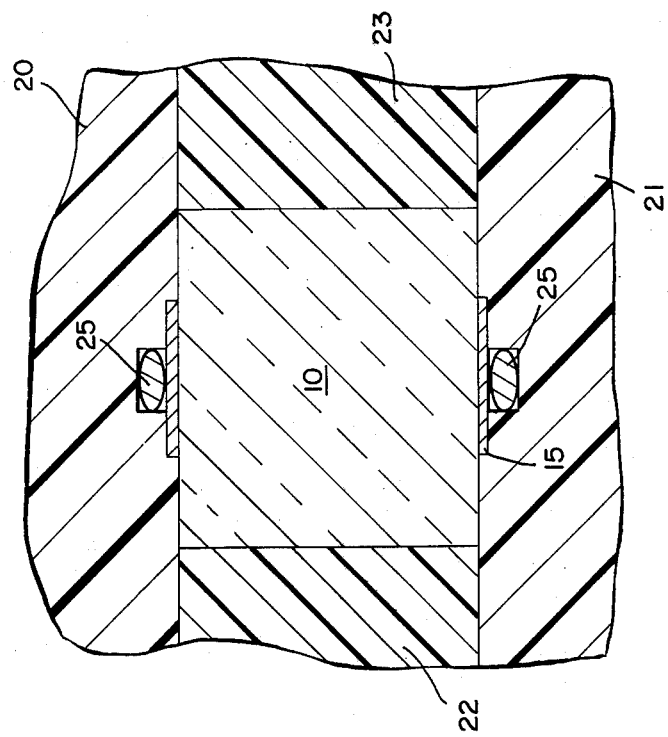
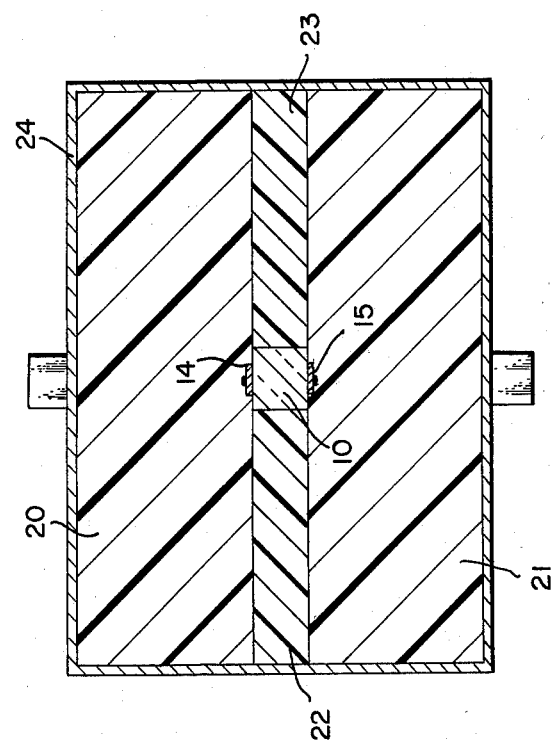

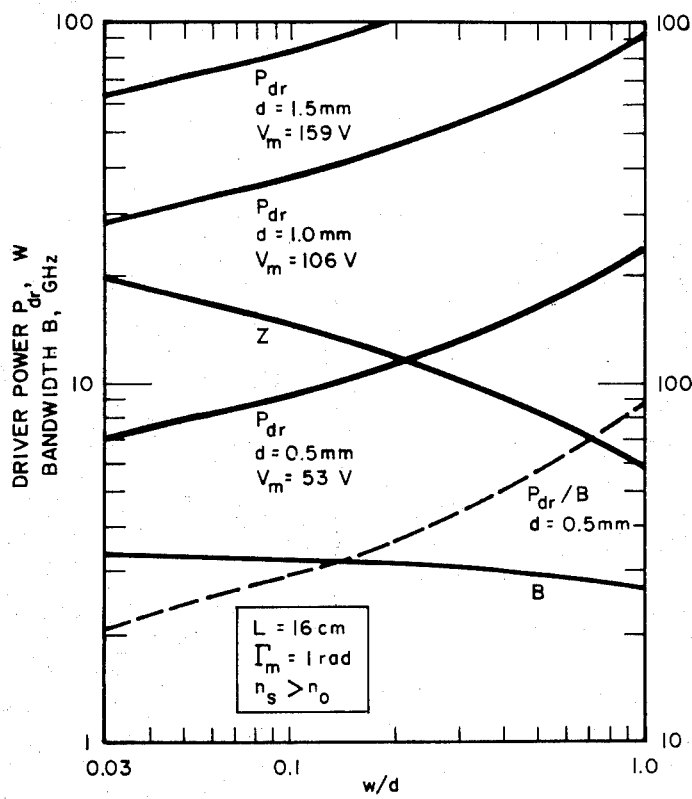
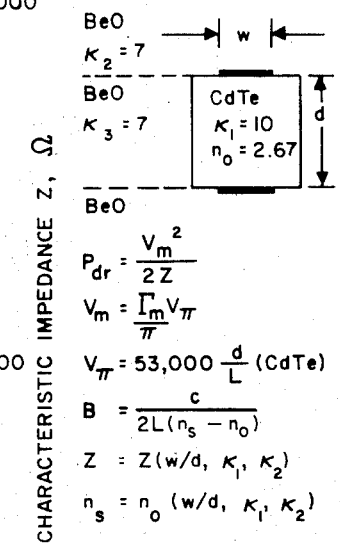
Fig. 4.
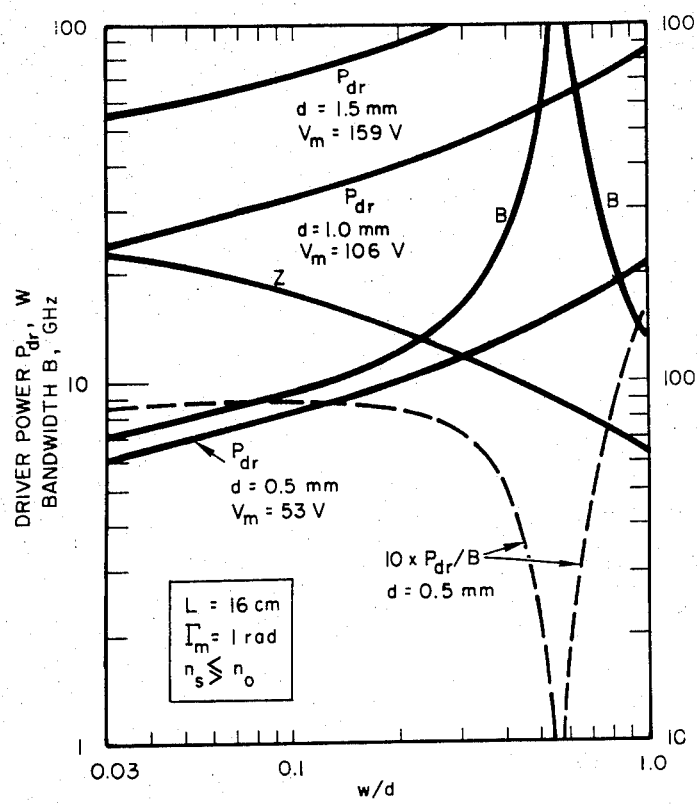
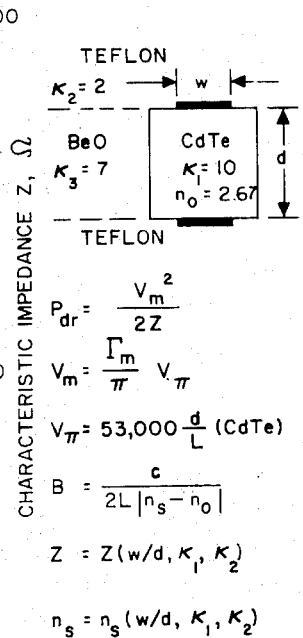
Fig. 5.

SYNCHRONOUS TRAVELING WAVE ELECTRO-OPTIC LIGHT PIPE MODULATOR

BACKGROUND OF THE INVENTION

A continuing need exists to develop wideband electrooptic modulators which are capable of meeting the extended bandwidth requirements of advanced laser communication and data processing systems at reasonably modest levels of driver power. This need is particularly acute at longer infrared wavelengths such as 10.6 micrometers where conventional, diffraction limited modulator devices impose typically kilowatt levels for high modulation depths at bandwidths of 300 MHz and higher.

Prior art traveling wave electro-optic modulators of the general TEM parallel strip transmission line type have been designed for diffraction limited operation wherein the optical beam is focused through the device — or is transmitted unfocused as a narrow collimated beam — with a resulting limit of length to cross-section ratio substantially less than that disclosed herein. Moreover, velocity synchronism has in the past been achieved only at the expense of a low characteristic impedance as described, for example, by C. J. Peters in the "Proceedings IEEE" 51, 147 (1963).

It is an object of the present invention to alleviate the excessive driver power burden of conventional wideband electro-optic modulators used with infrared lasers such as $CO_2$ lasers operating at 10.6 micrometers.

SUMMARY OF THE INVENTION

This is achieved by forming the electro-optic crystals into a "light pipe" configuration for the optical beam and providing narrow strip electrodes to form a TEM transmission line for the signal wave. The resulting structure allows lower driver voltages because of the large length to cross-section ratio and it allows very wide bandwidths by virtue of achieving velocity matching. The device thus provides optical waveguiding of the laser beam through an interaction distance which is greater than and preferably many times greater than the distance over which the laser beam may be focused (hereafter referred to as the depth of focus or the diffraction limit of the beam, as well as, essentially perfect radio frequency and optical velocity synchronism and a relatively high electrical impedance level dependent upon the choice of strip electrode geometry and dielectric environment. The electro-optic members are preferably of cadmium telluride. The waveguide modulator combines the inherent wideband characteristics of a parallel strip transmission line with the driver power economy afforded by an optical waveguide structure.

BRIEF DESCRIPTION OF THE DRAWING

These and other objects, advantages and features of the invention will be more apparent from a detailed discussion below taken in conjunction with the accompanying drawings wherein like reference characters refer to like parts throughout and in which:

FIG. 2 is a cross-sectional view taken on the line 2—2 of FIG. 1.

FIG. 3 is an enlarged view showing the mounting of the strip electrodes in the waveguide rods shown centrally in FIG. 2.

FIGS. 4 and 5 are graphs illustrating the electrical characteristics of first and second modifications of the device as a function of the geometric parameters of the respective modifications.

DETAILED DESCRIPTION OF THE INVENTION

Figure 1:
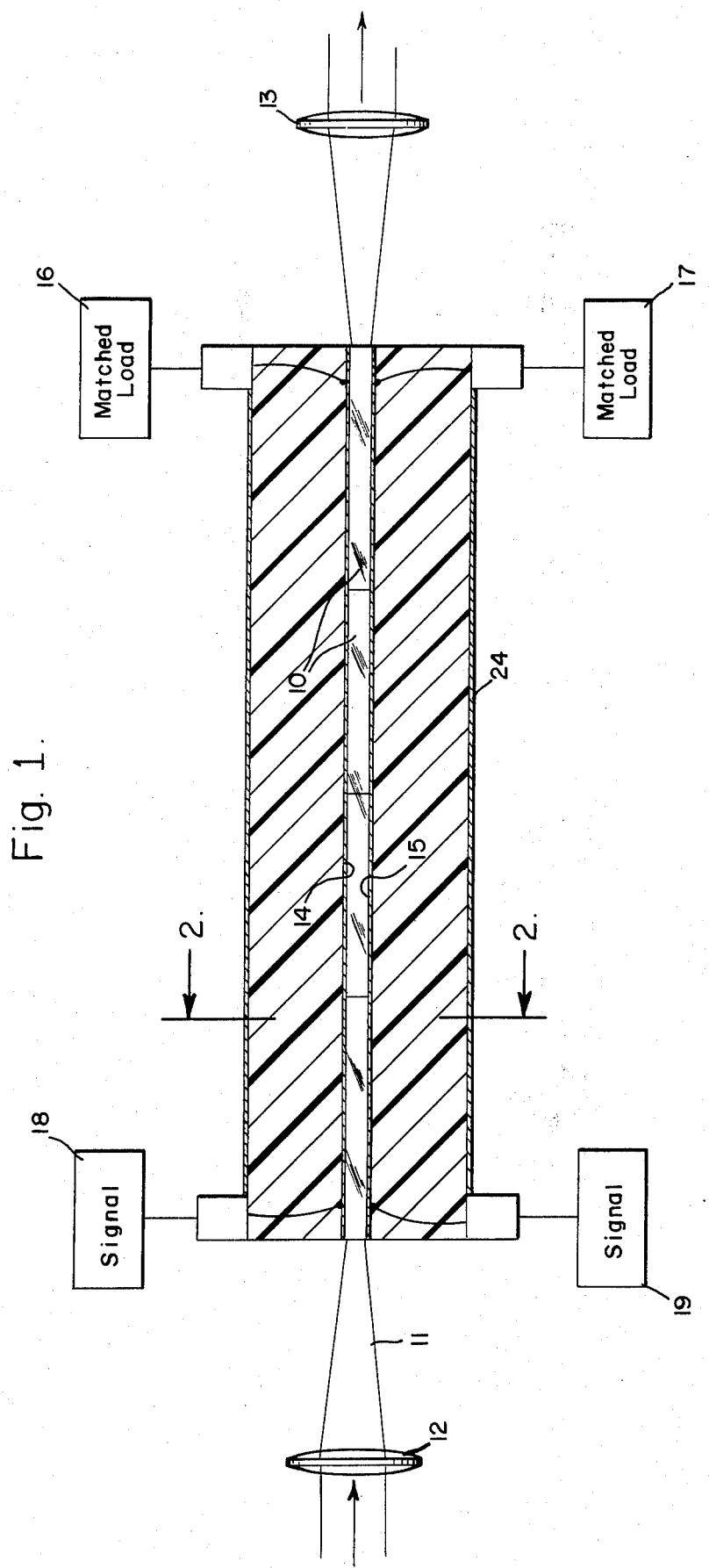
FIG. 1 is a longitudinal sectional view, partially schematic, illustrating an electro-optic modulator in accordance with the present invention.

The basic design of the traveling wave modulator structure is depicted in FIGS. 1, 2 and 3 and comprises an array of very slender rectangular rods 10 of cadmium telluride or other suitable electro-optic material laid in juxtaposition end-to-end to form a light pipe for an infrared beam such as a 10.6 micrometer beam 11 which may conveniently be the output of an infrared laser which is focused into the light pipe by lens 12 and which is received and recollimated at the output end of the light pipe by lens 13. It will be understood that cadmium telluride is essentially transparent and electro-optically active on a wavelength range of 2 through 23 micrometers and that its use at 10.6 micrometers represents merely a preferred embodiment. The length-to-cross-section ratio of the light pipe is many times greater than the diffraction limit of the beam 11. Consequently, the voltage, and hence the power, required to achieve a given depth of modulation is substantially reduced. The modulating signal is applied as a synchronous or nearly synchronous traveling wave across two parallel strip electrodes 14 and 15 respectively which form a TEM-type transmission line exhibiting a purely resistive impedance, with matched termination loads 16 and 17 respectively, and a theoretically infinite base bandwidth. The signal is applied from push pull signal sources 18 and 19 respectively to the input end of waveguide members 10 and is conducted through the strip electrodes 14 and 15 to the output end of the waveguide and thence to the matched load elements 16 and 17.

The cadmium telluride rods 10 must be antireflection coated on their polished end faces. Their sides must also be polished to a smoothness sufficient to minimize optical loss due to internal scattering. The strip electrodes 14 and 15 of the desired width are vacuum deposited or electro plated along the center line of the top and bottom surfaces of each rod 10. Electrical continuity and hook-up are provided by flattened, fine copper wires 25 which, as best seen in FIG. 3, are laid into premachined grooves along the centers of each of the upper and lower environment defining members 20 and 21. These members 20 and 21 are composed of beryllium oxide in one preferred embodiment and may alternatively be composed of teflon in another preferred embodiment. Beryllium oxide spacer members 22 and 23 are used to support the environment defining members 20 and 21 in appropriately spaced relationship with respect to the light pipe waveguide and to provide alignment and add rigidity. The entire modulator structure is contained in a grounded metallic housing 24.

There is shown in FIG. 4 a graph of various characteristics of the device for the case where a uniform enclosure of beryllium oxide is used. On the other hand, there is shown in FIG. 5 a similar graph of characteristics of the device for the case where Teflon environment defining and supporting members 20 and 21 are used and the spacing members 22 and 23 are of beryllium oxide.

In either embodiment attainment of approximate match in velocity of the signal and optical wave will assure a bandwidth capability for the modulator which can be well in excess of 1 GHz. A structural variable which can be adjusted to achieve a desired signal velocity, for a given dielectric environment, is the width, $w$ of the strip electrodes relative to their separation, $d$. This ratio, $w/d$, is the independent variable in the graphs of FIGS. 4 and 5 and other modulator characteristics such as impedance, bandwidth, and driver power are shown plotted as a function of this variable for the two above-identified embodiments respectively. In the specific illustration of FIGS. 1, 2 and 3 the electrode width, $w$, as can be best seen in FIG. 3, is shown as being substantially less than the separation, $d$, of the electrodes which is the cross-sectional dimension of the waveguides 10. This example emphasizes a special feature of this modulator. Narrow electrodes lead to higher signal wave velocity and at the same time to higher characteristic impedance and thus lower drive power. Waveguide supporting materials may be chosen so that their dielectric properties allow essentially ideal velocity match conditions at a respectably high characteristic impedance level.

A practicable lower limit of 0.5 millimeters is assumed for the cross-sectional dimension of the modulator rods 10. Other, larger cross-sectional dimensional, namely 1.0 and 1.5 millimeter are also assumed for comparison purposes. The active length is taken to be 16 centimeters comprising four rods each 4 centimeters in length. For the smallest aperture dimension of 0.5 millimeter, the modulator can handle laser powers in excess of 10 watts.

A conformal mapping theory is used to evaluate the characteristic impedance Z and signal wave velocity $c/n_s$ of the modulator as a function of the electrode width-to-spacing ratio $w/d$, for several choices of dielectric environment. The signal wave velocity relative to the velocity of light, $c$, is determined by an effective refractive index, $n_s$, in the conventional parlance of optics. FIG. 4 is a graph of the results so obtained for a modulator completely contained in a supporting block of beryllium oxide. Shown therein are the characteristic impedance, Z, bandwidth, B, and driver power $P_{dr}$, plotted as a function of the ratio $w/d$. Three different curves of driver power are shown corresponding to the three aforementioned choices of value of the cross-section, $d$, of the cadmium telluride waveguide rod 10. The power levels shown are all calculated for an assumed modulation depth corresponding to an electro-optical phase retardation of one radian. The bandwidth is determined solely by a velocity mismatch condition and is chosen as that upper limit frequency at which the signal and optical wavefronts suffer a relative phase shift of 180° during their transit through the length L of the modulator. The defining relationship for bandwidth is shown in the legend of FIG. 4 in which $n_o$ represents the optical refractive index of cadmium telluride at 10.6 micrometer wavelength. Other pertinent formulas are also shown involving the peak modulation voltage $V_m$ and associated peak electro-optic phase retardation $\Gamma_m$. The half-wave voltage $V_\pi$ corresponds to $\Gamma_m = \pi$ radians. Various relevant dielectric constants are indicated in the legend by $K_i$. Also shown plotted in dashed lines is the power per unit bandwidth.

For the particular dielectric environment represented in FIG. 4, the signal wave refractive index $n_s$ is always larger than the optical index $n_o$ and increases with increasing electrode width $w$. Consequently, the bandwidth gradually decreases proportionately. If the supporting members of dielectric constant $K_2$ are made of Teflon ($K_2 = 2$) while the beryllium oxide spacer of members ($K_3 = 7$) are retained, $n_s$ is significantly reduced and we obtain the results shown in FIG. 5. Over a range of $w/d$ less than about 0.55, $n_s$ is less than $n_o$. For higher values of $w/d$, $n_s$ is greater than $n_o$. At some value of $w/d$ near 0.55, we have perfect velocity matching and the bandwidth theoretically becomes infinite. In practice this does not occur because of higher modes developing on the transmission line. It is significant that the bandwidth values in this case are all higher than those of FIG. 4. A similar though less pronounced increase in characteristic impedance occurs with a resulting slight reduction in driver power.

It is obvious that the use of Teflon as a supporting medium results in a modulator of improved efficiency and noticeably increased bandwidth. In either embodiment, however, there is more than adequate bandwidth capability to satisfy current and immediate future systems needs. To pinpoint a specific operating condition, it will be noted from FIG. 5 that a value of electrode width-to-spacing ratio $w/d$ of 0.15 yields a modulator characteristic impedance of 150 ohms, and a bandwidth is 10 GHz, and the driver power required for $\Gamma_m = 1$ radian and $d = 0.5$ millimeter is only 9 watts.

Because a modulator characteristic impedance of about 150 ohms is not only achievable but also practical, and since current transistorized wideband modulator drivers which are available are being made with push-pull output stages, it is preferred to use a balanced drive modulator of the general form shown in FIG. 1. For best matching conditions, it is assumed that the driver will be mounted either directly on top of or in immediate juxtaposition to the modulator. Since a virtual ground exists at the central plain of the modulator, midway between the electrodes, each of the two push-pull output drivers should have a source impedance of 75 ohms and drive the modulator through short lengths of 75 ohm cable. The entire modulator structure is contained in a grounded metal housing 24 as noted above.

It is thus seen that there has been provided a wideband electro-optic modulator which is capable of meeting the extended bandwidth requirements of advanced laser communication and data processing systems at reasonably modest levels of driver power. The device is particularly suited for use at 10.6 micrometers where prior art diffraction limited modulator devices impose typically kilowatt levels for high modulation depths at bandwidths of 300 MHz and higher by contrast to the driver power $P_{dr}$ shown plotted in units of watts as a function of the ratio $w/d$ in each of FIGS. 4 and 5 for the two above-identified preferred embodiments.

What is claimed is:
1. A synchronous traveling wave electro-optic modulator for ultra wideband infrared laser communication systems comprising:
   a. an optical waveguiding means for confining the laser beam in the two dimensions perpendicular to the direction of laser beam propagation so as to propagate said beam along a predetermined path in the third dimension for interaction with a modulating signal, said interaction path having a length greater than the depth of focus of the laser beam; and
   b. synchronizing means for establishing velocity synchronism between the modulating signal and laser beam in said optical waveguiding means comprising dielectric members defining an environment for said interaction path and strip electrode members along the length of said interaction path having a width no greater than the approximate cross section of the waveguiding means for applying said modulating signal to said optical waveguiding means, said synchronism being a function of the geometric parameters of said strip electrodes and said dielectric members.

2. A device as in claim 1 wherein said optical waveguiding means comprises a plurality of rectangular rods of cadmium telluride laid in juxtaposition end-to-end to form a light pipe waveguiding means for an infrared wavelength laser beam, and wherein said strip electrode members comprise a first electrically conductive strip on the top of each of said rods and a second electrically conductive strip on the bottom at each of said rods.

3. A device as in claim 2 wherein said laser beam has a wavelength lying in the range between 2 and 23 micrometers.

4. A device as in claim 2 wherein said synchronizing means dielectric members comprise first and second supporting members each having the same cross-section which is larger than the cross-section of said light pipe waveguiding means and each extending at least the full length of said light pipe waveguiding means, said first supporting member being positioned above said waveguiding means and having first continuous electrical conductor means formed in its lower surface and said second supporting member being positioned below said waveguiding means and having second continuous electrical conductor means formed in its upper surface, said first conductor means contacting said first strip electrodes and said second conductor means contacting said second strip electrodes to provide electrical continuity between juxtaposed strip electrodes in said light pipe waveguide; first and second spacer means having a thickness equal to the thickness of said waveguiding means and being positioned between said first and second supporting means on opposite sides of said waveguiding means; and a grounded metallic shield surrounding the assembly of said waveguiding means having said first and second spacer on opposite sides thereof and said first and second supporting members above and below it.

5. A device as in claim 4 wherein said waveguiding rods are formed of cadmium telluride, said first and second supporting members are formed of Teflon, and said first and second spacer members are formed of beryllium oxide.

6. A device as in claim 4 wherein said waveguiding rods are formed of cadmium telluride, said first and second members are formed of beryllium oxide, and said first and second spacer members are also formed of beryllium oxide.

7. A device as in claim 4 wherein said strip electrodes are connected to a push-pull source of modulating signal at one end of each of said strip electrodes and are connected to matched loads at the other end of each of said strip electrodes.

8. A device as in claim 2 wherein said geometric parameters include the value of the ratio of $w/d$, where $w$ is the width of the strip electrodes and $d$ is the separation between said first and second strips, which ratio is chosen to have a value such that the value of $n_s$, the effective signal wave refractive index is approximately equal to $n_o$, the optical refractive index for the laser beam in the waveguiding means, to afford synchronous velocity matching of said signal wave and said optical wave, thereby to maximize the bandwidth of said waveguide means.

9. A device as in claim 2 wherein the width of the strip electrodes is substantially less than the separation between said first and second strips to cause an increase in the signal wave velocity and the characteristic impedance and thereby reduce driver power.

* * * * *